United States Patent
Berzon et al.

(10) Patent No.: US 10,669,459 B2
(45) Date of Patent: Jun. 2, 2020

(54) POLYURETHANE BASED ADHESIVE FOR POLARIZING STRUCTURE AND POLARIZED LENS

(71) Applicant: ESSILOR INTERNATIONAL (COMPAGNIE GENERALE D'OPTIQUE), Charenton-le-pont (FR)

(72) Inventors: Ronald A. Berzon, Dallas, TX (US); Aref Jallouli, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 914 days.

(21) Appl. No.: 14/778,215

(22) PCT Filed: Mar. 20, 2013

(86) PCT No.: PCT/IB2013/012270
§ 371 (c)(1),
(2) Date: Sep. 18, 2015

(87) PCT Pub. No.: WO2014/147439
PCT Pub. Date: Sep. 25, 2014

(65) Prior Publication Data
US 2016/0108298 A1 Apr. 21, 2016

(51) Int. Cl.
| | |
|---|---|
| C09J 175/06 | (2006.01) |
| C08L 75/04 | (2006.01) |
| C08G 18/42 | (2006.01) |
| B29D 11/00 | (2006.01) |
| C09J 175/04 | (2006.01) |
| C08L 75/06 | (2006.01) |
| G02B 1/04 | (2006.01) |
| B32B 7/12 | (2006.01) |
| B32B 27/08 | (2006.01) |
| B32B 27/30 | (2006.01) |
| B32B 37/10 | (2006.01) |
| B32B 37/12 | (2006.01) |
| G02B 5/30 | (2006.01) |

(52) U.S. Cl.
CPC ......... *C09J 175/06* (2013.01); *B29D 11/0073* (2013.01); *B29D 11/00644* (2013.01); *B32B 7/12* (2013.01); *B32B 27/08* (2013.01); *B32B 27/306* (2013.01); *B32B 37/10* (2013.01); *B32B 37/1207* (2013.01); *B32B 37/1284* (2013.01); *C08G 18/4269* (2013.01); *C08L 75/04* (2013.01); *C08L 75/06* (2013.01); *C09J 175/04* (2013.01); *G02B 1/04* (2013.01); *B32B 2037/1215* (2013.01); *B32B 2551/00* (2013.01); *C09J 2475/003* (2013.01); *G02B 5/3025* (2013.01)

(58) Field of Classification Search
None
See application file for complete search history.

(56) References Cited

U.S. PATENT DOCUMENTS

| | | | | |
|---|---|---|---|---|
| 4,395,530 | A * | 7/1983 | Hammond | C08G 18/089 528/44 |
| 4,412,033 | A * | 10/1983 | LaBelle | C08G 18/10 156/331.4 |
| 4,511,626 | A * | 4/1985 | Schumacher | C08G 18/10 427/409 |
| 5,239,039 | A | 8/1993 | Markle | |
| 5,922,805 | A * | 7/1999 | Bouttefort | C08G 18/12 156/327 |
| 5,965,256 | A * | 10/1999 | Barrera | B05D 5/083 428/354 |
| 6,733,887 | B2 | 5/2004 | Okoroafor et al. | |
| 7,253,213 | B2 | 8/2007 | Kutal et al. | |
| 2005/0137376 | A1 * | 6/2005 | Symietz | C08G 18/088 528/44 |
| 2009/0252897 | A1 | 10/2009 | Matsuo et al. | |

FOREIGN PATENT DOCUMENTS

| | | |
|---|---|---|
| CN | 1343892 | 4/2002 |
| CN | 1406997 | 4/2003 |
| CN | 102639315 | 8/2012 |
| JP | 04-120363 | 4/1992 |
| JP | 2012-184385 | 9/2012 |
| WO | 2011/053329 A1 | 5/2011 |

OTHER PUBLICATIONS

Compound summary for "Caprolactone", US National Library of Medicine, retrived Apr. 6, 2018.*
Nicolais, L. and Tanzi, M. C., "Polyurethane Precursors", Wiley Encyclopedia of Composites, L. Nicolais (Ed.). doi:10.1002/9781118097298.weoc191, published online Sep. 15, 2011, pp. 1-17. (Year: 2011).*
Chinese Notification of the First Office Action with English Translation dated Dec. 28, 2016; Application No. 201380073994.3.
Japanese Notification of Reasons for Refusal dated Dec. 20, 2016; Application No. 2016-503726.
Japanese Analysis of the Third Party Observation submitted on Aug. 22, 2016; Application No. 2016-503726.
International Search Report, dated Sep. 10, 2013, from corresponding PCT application.

* cited by examiner

*Primary Examiner* — Anish P Desai
(74) *Attorney, Agent, or Firm* — Young & Thompson

(57) ABSTRACT

A polyurethane based adhesive containing one polyol compound derived from caprolactone monomer having a number average molecular weight between 200 and 1000 combined with a polyisocyanate compound. The functionality of the polycaprolactone polyol is between 1 and 4. Other aspects include a polarizing layered structure, a polarized lens and a method for manufacturing same all of which include the polyurethane based adhesive. The adhesive avoids delamination and is useful in optical applications where it will be in contact with water, for example during surfacing or edging process.

12 Claims, 1 Drawing Sheet

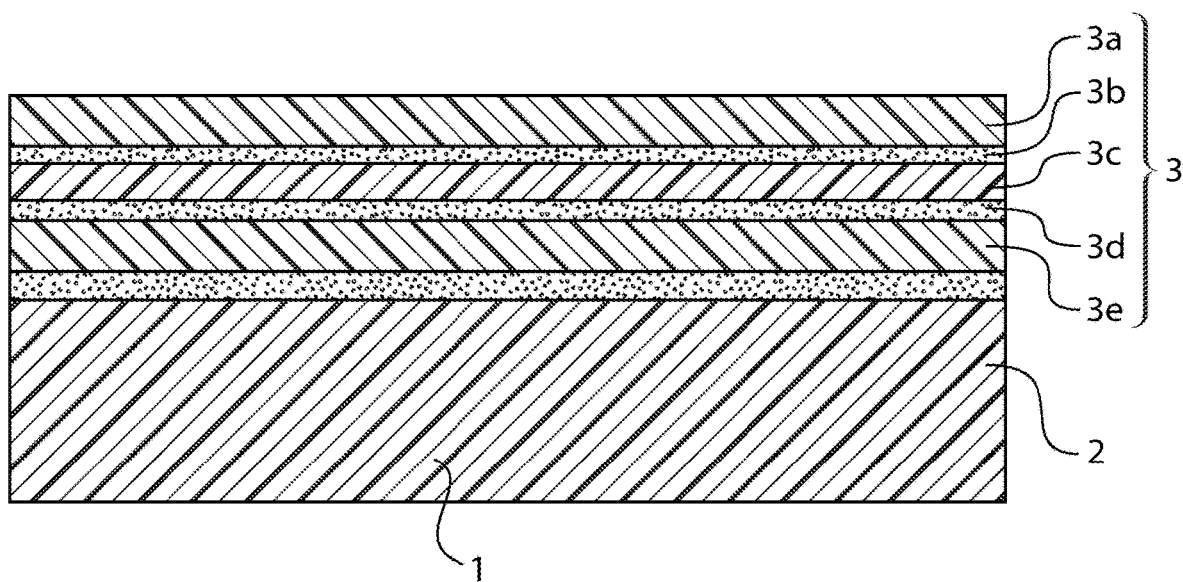

POLYURETHANE BASED ADHESIVE FOR POLARIZING STRUCTURE AND POLARIZED LENS

BACKGROUND OF THE INVENTION

1. Field of the Invention

The invention relates to a polyurethane based adhesive used for manufacturing a polarizing structure. It also relates to a polarized ophthalmic lens comprising such polarizing structure.

2. The Prior Art

The optical or transmission properties of ophthalmic lenses can be modified by laminating a film onto a lens surface. These films are often referred to as functional films such as polarizing films which are capable of reducing glare while providing a high level of optical transmission.

There are many ways to make polarized lenses, such as by injecting a lens against a polarizing film, casting a lens adjacent a polarizing film, casting a lens containing a polarizing film, or laminating the film with a glue. It is known to manufacture a polarized optical lens by laminating a polarizing structure onto a lens surface. Typically, an adhesive layer, for example thermal or UV curable glue, holt melt adhesives (HMA) or pressure sensitive adhesive (PSA) is placed between one surface of the optical lens and the polarizing structure, so as to permanently retain the structure on the surface of the optical lens. Such polarizing structure is obtained by incorporating a polarizing film, for example a polyvinyl alcohol (PVA) polarizer between two protective films. Materials for the protective layers can typically include cellulose triacetate (TAC), polycarbonate (PC), cellulose acetate butyrate (CAB), poly(methyl methacrylate) PMMA or poly(ethylene terephthalate) (PET). The polarizing structure is laminated together with a water based adhesive between the protective films and the PVA film, such as a polyvinyl alcohol (PVOH) based adhesive. This adhesive can be sensitive to water; therefore, the TAC/PVA/TAC structure has very poor wet adhesion and can be easily separated when contacted with water.

Because of the water sensitivity of this polarizing structure and its poor wet adhesion, the polarized laminated lens comprising such structure has delamination problems during wet wheel edging during processing of polarized lenses. More particularly, it has been seen that the TAC-PVA-TAC film ensemble is separated at the edge of the lens due to the combined effects of wheel edging force with water during the edging process.

SUMMARY OF THE INVENTION

There is a need to provide a new and efficient adhesive for polarizing structure that is moisture resistant in order to withstand wet edging processing conditions.

Therefore, it is an object of the invention to provide an adhesive that can be manufactured simply and is suitable for optical lamination applications.

It is a further object to provide a strong adhesive between the films within the polarizing structure which delivers excellent performance during the wet edging process.

Another object of the invention is to provide a polarizing layered structure that is compatible with any method for making polarized lenses, such as lamination, casting or film injection molding.

It is a further object according to another embodiment of the invention to provide a method for manufacturing a polarizing structure using a polyurethane based adhesive.

It is yet another object to provide a polarized ophthalmic lens which includes a polarizing structure containing a new polyurethane based adhesive.

These and other related objects are achieved according to a first aspect of the invention involving a bi-component polyurethane based adhesive obtained by reacting at least one polyisocyanate compound with at least one polyol compound derived from caprolactone monomer having a number average molecular weight more than 200 and less than 1000.

The two components are mixed at a molar ratio of NCO to OH in a range of 1:1-3:1 and preferably 3:1. In a preferred embodiment of the invention, the polycaprolactone polyol monomer has a number average molecular weight more than 200 and less than about 300. The polyisocyanate compound can be an aliphatic diisocyanate such as based on hexamethylene diisocyanate. The functionality of the polycaprolactone polyol is more than about 1 and less than about 4, and preferably in a range between 2.3 and 2.5.

This inventive adhesive system is based on a specific and simple formulation including polycaprolactone with low molecular weight that can solve the above-cited technical problems and gives unexpected and good results. Another benefit of the adhesive of the present invention is that it is not a water based chemistry or solvent based chemistry as conventional polyurethane adhesive. Therefore it can be easily manufactured and used in film lamination to replace the current PVOH adhesive.

A second aspect of the invention involves a polarizing structure comprising a polarizing film and a protective film provided on at least one face of the polarizing film. A layer of the polyurethane based adhesive is disposed between the polarizing film and the protective film so as to form a polarizing structure. The polarizing film is a light-polarizing polyvinyl alcohol-based layer (PVA).

According to a preferred embodiment of the invention, the polarizing film is sandwiched between two protective films. Materials of the protective films may be identical or different, for example, selected from the group consisting of polycellulosics, polycarbonates, polyesters, poly(meth)acrylics, polycyclic olefin copolymers, polyolefinics, thermal plastic polyurethanes, polythiourethanes, polyvinyls, polystyrenes, polyamides, polyimides, polysulfones, polyether sulfones, poly ether ether ketones, polyphenylene sulfides, polyoxymethylenes, polyurethanes, epoxys or blend thereof, triacetyl cellulose-base layers (TAC), polycarbonate layers (PC), poly(ethylene terephthalate) (PET), poly(methyl methacrylate) PMMA, polystyrene (PS), and cellulose acetate butyrate (CAB).

A third aspect of the invention involves a method for manufacturing a laminated polarizing structure. A polarizing film and at least one protective film preferably two protective films are provided. For the production of a laminated polarizing structure, a layer of polyurethane based adhesive of the present invention is deposed between the polarizing film and the protective films. The adhesive can also be applied either onto one face of the polarizing film or one face of the protective film by spin coating or roll coating or both. The protective films are pressed against the polarizing film to form a polarizing structure. The layered structure is cured at a temperature between 40° C.-90° C. for about 16 hours.

Prior to the deposing step, if necessary, the protective film is surface treated with at least a caustic treatment so as to improve the adhesion. Plasma, corona, primer layer(s), chemical surface modification or ultraviolet treatment or any combination may be used.

A fourth aspect of the invention involves a polarized optical element having a polarizing structure of the present invention adhered directly to an optical base element to form a polarized optical element. The optical element includes an adhesive layered structure disposed between the base element and the polarizing structure so as to permanently retain the polarizing structure on the base element. The adhesive structure includes a tri-layer adhesive structure which comprises a layer of hot melt adhesive layer sandwiched between two latex layers or a pressure sensitive adhesive layer. For the purpose of the invention, the expression "optical base element" is understood to mean ophthalmic lenses and lenses for optical instruments; "opthalmological lenses" are defined as lenses adapted namely for mounting in eyeglasses whose function is to protect the eye and/or to correct vision; these lenses are selected from the afocal, unifocal, bifocal, trifocal, and progressive lenses. The bonding of the polarizing structure occurs independently of the manufacturing of the optical base element and of its thermosetting or thermoplastic nature. The optical base element is made of a material classically used in optics and ophthalmology. By way of information but not limitation, the materials are chosen from among the polycarbonates; polyamides; polyimides; polysulfones; copolymers of polyethylene there phthalate and polycarbonate; polyolefins, namely polynorbornenes; polymers and copolymers of diethylene glycol bis(allylcarbonate); (meth)acrylic polymers and copolymers, namely (meth)acrylic polymers and copolymers derived from bisphenol-A; thio(meth)acrylic polymers and copolymers; urethane and thiourethane polymers and copolymers; epoxy polymers and copolymers; and episulfide polymers and copolymers.

Advantageous, at least one functional coating may give the optical element additional functions. Such coatings may in fact be placed easily on the protective film, given that the latter is made of a chemically inert material.

BRIEF DESCRIPTION OF THE DRAWING

The FIGURE is a diagram illustrating the various layers of the polarizing structure laminated to an optical base element.

DETAILED DESCRIPTION OF THE PREFERRED EMBODIMENTS

In this application the following definitions apply to the various words mentioned.

Film refers to single layer of material, for example a TAC film or a PVA film.

Polarizing structure refers to a layered structure comprising a polarizing film, for example based on PVA or PET having, at least on one of its surfaces, a protective film. The ensemble performs a polarizing function. In the rest of the description, said layered structure is so called a polarizing structure.

Adhesive structure refers to a layered structure comprising a single layer of an adhesive, for example a pressure sensitive adhesive or several successive layers of adhesive, for example a tri-layer adhesive structure comprising a hot melt adhesive layer sandwiched between two latex layers.

HMA means a hot melt adhesive.

PVA refers to a polarized polyvinyl alcohol film, that is a single film layer.

PVOH refers to a polyvinyl alcohol, that is a solid dissolved in a liquid that and is used as a component in an adhesive system.

NCO refers to an isocyanate group.

OH refers to a hydroxyl group.

HCl refers to hydrochloric acid.

SF means a semi-finished lens, that is a lens with one optical surface and another surface side that needs to be ground to the wearer's optical power.

Rx means a prescription for an ophthalmic lens.

Wheel edging or wet wheel edging means mechanical shaping of the perimeter of an optical article using a grinding wheel typical in the optical industry without or with water.

There is a need in the optical industry to manufacture polarized lenses. While they provide protection from the sun as do fixed tint lenses, they add an extra feature of reducing or eliminating glare which provides more comfort and safety to the wearer. Polarized optical articles typically contain a polarizing medium such as a polarizing film which may be manufactured from PVA (U.S. Pat. No. 2,237,567), which is well known in the industry, In other cases where more durability is desired, the polarizing structure may also include two protective films, which are positioned one on each side of the polarizing film. U.S. Published Patent Application 2010/0202049 describes a polarizing structure where a PVA polarizing film is sandwiched in-between cellulose triacetate (TAC). This polarizing structure is referred to as a wafer or a polarizing plate as described in U.S. Published Patent Application 2008/0278810. The adhesive used in this case is an aqueous based solution consisting of a PVA material (Dp~2000, 94% hydrolyzed) containing acetacetyl groups (5%), zirconium amine compound (AC-7) with the pH controlled to ~8.5 by 1M HCl. An epoxy resin adhesive is described in U.S. Published Patent Application 2010/0110542. The PVA can also contain useful molecules such as melanin as described in U.S. Pat. No. 7,029,758. Other protective films may be but not limited to films, including those described in US Appl. 20100157195, of transparent polymers such as cellulose based polymers such as diacetylcellulose and triacetyl cellulose (TAC), cellulose acetate butyrate (CAB); polycarbonate (PC) based polymer; polyester based polymers such as polyethyleneterephthalate (PET), polyethyleneterephthalate glycol (PETG) and polyethylene naphthenate; acrylate based polymers such as polymethacrylate (PMA); methacrylate polymers such as polymethyl methacrylate (PMMA); thermoplastic urethane polymers (TPU); polythiourethane based polymers; vinyl based polymers such polyvinyl chloride, polyvinyl alcohol, polyvinylidene chloride, polyvinyl butyral; styrene based polymers such as polystyrene, styrene methylmethacrylate copolymers (SMMA), styrene maleic anhydride polymers (SMA), acrylonitrile-styrene (ANS) copolymers, acrylonitrile butadiene styrene (ABS) terpolymers, (meth)acrylate butadiene styrene (MBS) terpolymers; olefin based polymers such as polyethylene, polypropylene, polymethylpentene (PMP), cyclic (COC) or norbornene structure-containing polyolefins, and ethylene-propylene copolymers; amide based polymers such as nylon and aromatic polyamide; imide based polymers; polyether imide based polymers; polysulfone based polymers; polyether sulfone based polymers; polyether ether ketone based polymers; polyphenylene sulfide based polymers; polyoxymethylene based polymers; and epoxy based polymers, or any blend thereof.

When using water based adhesives to assemble a polarizing structure, it is important that the structure remains intact during all stages of processing. This includes the manufacturing process of the structure itself, the manufacturing process that provides a polarizing lens and the process that allows the lens to be a useful ophthalmic product for the wearer. During the processing of the polarizing lens, it is common to surface/grind and polish the lens to a specific optical power. This process typically involves exposure of the polarizing lens to water. The process of edging or shaping the lens to fit into a frame can also expose the polarizing lens to water. It is very important that the polarizing structure remains intact and that no separation occurs between its layers.

Therefore, an inherent problem exists in processing laminates containing water based adhesives. Accordingly, one embodiment of the present invention includes a new and specific composition of polyurethane adhesive in order to solve this delamination problem within the polarizing structure during a wet edging process.

Preparation of this new adhesive is simple. A certain amount of polycaprolactone polyol is weighed into a 200 ml beaker and a polyisocyanate is then added to the beaker and stirred on an IKA Werke magnetic stir plate. The polyisocyanate is a water-dispersible polyisocyanate, and more specifically, it is a hydrophilic aliphatic polyisocyanate based on hexamethylene diisocyanate (HDI). The solution is then mixed under vacuum to degas using a Welch Chemstar vacuum pump. To avoid overflow, the vacuum is first throttled until the foamy head subsides. Once the foamy head bubbles break, a full vacuum can be applied until the solution is suitably degassed.

In order to obtain an adhesive with good adherence and moisture resistance while keeping high optical quality, various formulations of the adhesive are prepared by varying the following parameters: functionality ($fn$) which is the average number of species, OH groups that reside on a molecule, number average molecular weight (Mn), and the ratio of isocyante (NCO) to hydroxyl groups (OH).

It has been found that a useful and efficient adhesive can be obtained by reacting polyisocyanate and polycaprolactone polyol with the following specific technical characteristic. The functionality ($fn$) should be more than 1 and less than 4; preferably between 2 and 3, and most preferably between 2.3 and 2.5. The number average molecular weight (Mn) should be more than 200 and less than 1000, preferentially, more than 200 and less than 300. The adhesive has a specific ratio of isocyanate (NCO) to hydroxyl groups (OH) ranging from 1:1 to 3:1. The Hydroxyl number should be more than 200 and less than 600, preferably more than 500 and less than 600.

The adhesive above described can be used in the manufacturing process of polarizing structure. For example, this adhesive could be used to make any polarizing structure by laminating a protective film on at least one face of the polarizing film. A coating of the polyurethane adhesive of the present invention is deposited, for example but not limited to by spin coating or roll coating either on one face of the polarizing film or one face of the protective film or both. When the polarizing structure includes two protective films, materials of protective films could be same or different, selected from but not limited to films, including those described in US Appl. 20100157195, of transparent polymers such as described above. The ensemble is heated in order to obtain an adherence between the protective films and the polarizer. Such heating may be carried out for example in an oven from 40° C. to 90° C. for about 16 hours.

For PC or PMMA protective films, additional surface treatments may be employed, for example, physical surface treatments such as corona or plasma, primer layer(s), ultraviolet treatment, chemical surface treatments such as addition of an adhesion promoter or any combination may be used.

The polarizing structure of the present invention is then laminated on a suitable ophthalmic base lens in order to manufacture a polarized ophthalmic lens. The polarizing structure is bonded to the surface of the lens by an adhesive structure. A proprietary adhesive tri-layer using a hot melt adhesive (HMA) and a latex (HMA/latex/HMA) is applied between the structure and the lens. Such trilayer adhesive system is described in WO2011/053329 owned by the same applicant as the present invention. In a variant of the method of manufacturing the polarizing lens, a pressure sensitive adhesive is used for adhering the polarizing structure onto the lens. In one embodiment of the invention, the polarizing structure includes one single protective film, this latter is placed on the opposite side of the polarizing film from the lens. In a preferred embodiment of the invention, the polarizing structure may also include two protective films. This results in better protection of the polarizing film. Furthermore, at least one functional coating may be placed on the protective film, such as but not limited to a function protecting against photodegradation or photo-oxidation, an anti-shock function, an anti-radiation function, an anti-reflection function, a color filtration function, a photochromic function, an antistatic function, an anti-contamination function.

Additionally, the polarized lenses may also be made by lamination, in-mold lamination, injection molding, or casting to permanently secure the polarizing structure to an optical base lens.

To illustrate the laminate structure of the examples, reference is made to the FIGURE which is a diagram showing an optical base element 1, an adhesive structure or adhesive system 2 and a polarizing structure 3. For example, adhesive structure 2 is a tri-layer adhesive system such as described above. The polarizing structure 3 includes a polarizer 3c sandwiched between two protective layers 3a and 3e. The polarizer 3c is adhered to protective layer 3a via an adhesive of the invention 3b; and the polarizer 3c is adhered to protective layer 3e via adhesive of the invention 3d.

EXAMPLES

Example 1 a) Preparation of Polyurethane Based Adhesive

In this example, 3.00 g (0.0291 moles) of Perstorp CAPA polycarprolactone polyol 3022 (OH #=544.5, fn~2.4, Mn=247.3), is added to a 200 ml tall beaker. Next, 18.34 g (0.0874 moles) of Bayer Desmodur DA-L polyisocyanate is then added to the beaker and carefully stirred on a magnetic plate to avoid bubbles. The ratio of NCO:OH is 3:1.

b) Manufacturing a Polarizing Structure

The formulation obtained in a) is used as adhesive solution for manufacturing a polarizing structure TAC-PVA-TAC. Triacetyl cellulose (TAC) films from LOFO High Tech Film have a thickness of 80 microns and are treated in a 10% caustic solution at 60° C. for 4-minutes followed by rinsing in D.I. water and dried at 50° C. for at least 15 minutes.

A commercial gray PVA polarizer 3c of 20 micron thickness is provided from Onbitt. The PVA polarizer is placed in between two TAC films 3a, 3e. The TAC/PVA/TAC sandwich is fed into a 2-roller laminator (5.1 cm roll diameter), equipped with a Dayton DC Speed Control that is adjusted to produce a linear film speed of about 21 cm/min. The adhesive 3b, 3d from section a) is applied between the PVA polarizer 3c and the TAC protective films 3a, 3e. Upon exiting the laminator, the laminated structure 3 is placed into an oven and cured from 40° C. to 90° C. over about 16 hrs (1 hr at 40° C., 12 hrs ramp to 90° C., 3 hrs at 90° C., and 20 min cool down to 60° C.).

c) Manufacturing of Polarized Lens

The polarizing structure (TAC-PVA-TAC) 3 obtained in b) is attached to a suitable ophthalmic lens (SF 0.25—base 1.67) 1 in a lamination process. A tri-layer adhesive system 2 using a HMA and a latex is applied between the lens and the polarizing structure. Such adhesive system has been described in WO2011/053329. The lamination process is has been described in WO2012/078152.

After lamination, the lens was surfaced to a minus power of −12.0 D then hard-coated. The polarizing lens manufactured by the above described method is subjected to wet edging using a Triumph edger. Afterwards, the edge is polished. The edge of the polarizer is visually examined for delamination. If the edge is pristine with no defects it passes adhesion inspection. If any part of the edge has separated or delaminated, it is considered a failure.

Using the adhesive from Example 1 multiple polarized lenses were made and all passed the edging test, indicating generally that Mn below 1,000 and specifically between 200 and 300 is preferable in the manufacture of higher quality polarized lenses. The functionality of the polycaprolactone polyol is between 1 and 4, preferably 2.3 to 2.5. These adhesive characteristics will allow processing of the laminated lens through surfacing/polishing and edging displaying excellent wet adhesion with very high yields.

Comparative Example 1

A polyurethane based adhesive was prepared in a similar conditions as in Example 1 with the exception that 6.00 g (0.0306 moles) of polycaprolactone polyester diol (CAPA 2043, fn=2, OH #=285.8, Mn=393) was used with 19.26 g (0.0917 moles) Desmodur DA-L having NCO:OH of 3:1.

Polarizing structures and polarized lenses were made in a similar manner to than example 1 with the exception that the adhesive was used for polarizing structures.

Edging results: Delamination was observed.

Comparative Example 2

A polyurethane based adhesive was prepared in a similar conditions as in Example 1 with the exception that 2.00 g (0.0102 moles) of polycaprolactone polyester diol (CARA 2047A, fn=2, OH #=287.0, Mn=391) was used with 6.45 g (0.0307 moles) Desmodur DA-L having NCO:OH of 3:1.

Polarizing structures and polarized lenses were made in a similar manner to than example 1 with the exception that the adhesive was used for polarizing structures.

Edging results: Delamination was observed.

Comparative Example 3

A polyurethane based adhesive was prepared in a similar conditions as in Example 1 with the exception that 3.00 g (0.0082 moles) of polycaprolactone polyester diol (CAPA 2077A, fn=2, OH #=154.0, Mn=729) was used with 5.19 g (0.0247 moles) Desmodur DA-L having NCO:OH of 3:1.

Polarizing structures and polarized lenses were made in a similar manner to than example 1 with the exception that the adhesive was used for polarizing structures.

Edging results: Delamination was observed.

Comparative Example 4

A polyurethane based adhesive was prepared in similar conditions as in Example 1 with the exception that 5.00 g (0.0167 moles) of polycaprolactone polyester triol (CAPA 3091, fn=3, OH #=187.5, Mn=898) was used with 10.53 g (0.0501 moles) Desmodur DA-L having NCO:OH of 3:1.

Polarizing structures and polarized lenses were made in a similar manner to than example 1 with the exception that the adhesive was used for polarizing structures.

Edging results: Delamination was observed.

Comparative Example 5

A polyurethane base adhesive was prepared in similar conditions as in Example 1 with the exception that 2.00 g (0.0202 moles) of trifunctional caprolactone polyol (CAPA 3031A, fn=3, OH #=566.1, Mn=297) having primary hydroxyl groups, was used with 12.71 g (0.0605 moles) Desmodur DA-L having NCO:OH of 3:1.

Polarizing structures and polarized lenses were made in a similar manner to than example 1 with the exception that the adhesive was used for polarizing structures.

Edging results: Delamination was observed.

Comparative Example 6

A polyurethane based adhesive was prepared in similar conditions as in Example 1 with the exception that 4.00 g (0.0159 moles) of tetra-functional caproiaetone polyol (CAPA 4101, fn=4, OH #=222.5, Mn=1009) having primary hydroxyl groups, was used with 9.99 g (0.0476 moles) Desmodur DA-L having NCO:OH of 3:1.

Polarizing structures and polarized lenses were made in a similar manner to than example 1 with the exception that the adhesive was used for polarizing structures.

Edging results: Delamination was observed.

TABLE 1

Bi-Component Polyurethane Mixtures and Molecular Weights

| Sample | Desmodur DA-L (g) | Capa # | Capa (g) | Molecular Weight | Functionality (fn) | Edging test |
|---|---|---|---|---|---|---|
| Example 1 | 18.34 | 3022 | 3.00 | 247 | 2.4 | Pass |
| Comp. Ex. 1 | 19.26 | 2043 | 6.00 | 393 | 2 | Fail |
| Comp. Ex. 2 | 6.45 | 2047A | 2.00 | 391 | 2 | Fail |
| Comp. Ex. 3 | 5.19 | 2077A | 3.00 | 729 | 2 | Fail |
| Comp. Ex. 4 | 10.53 | 3091 | 5.00 | 898 | 3 | Fail |
| Comp. Ex. 5 | 12.71 | 3031A | 2.00 | 297 | 3 | Fail |
| Comp. Ex. 6 | 9.99 | 4101 | 4.00 | 1009 | 4 | Fail |

Capa 3022: 2-Oxepanone, polymer with 2,2-oxybis (ethanol) and glycerol
Capa 2043: 2-Oxepanone, polymer with 1,4-butanediol
Capa 2047A: 2-Oxepanone, polymer with 1,6-hexanediol
Capa 2077A: 2-Oxepanone, polymer with 1,6-hexanediol
Capa 3091: 2-Oxepanone, polymer with 2-ethyl-2-(hydroxymethyl)-1,3-propanediol
Capa 3031A: 2-Oxepanone, polymer with 2-ethyl-2-(hydroxymethyl)-1,3-propanediol
Capa 4101: 2-Oxepanone, polymer with 2,2-bis(hydroxymethyl) 1,3-propanediol
Materials with an "A" indicate a premium grade with enhanced hydrolytic stability Based on Table 1, the main characteristics for the adhesive according to the invention can be categorized as follows. The tests have demonstrated that the use of specific polycaprolactone for the formulation of the adhesive is mandatory. The ideal formulation is presented in Example 1. The functionality (fn) should be preferably between 2.3 and 2.5. The functionality is the average number of species of interest or in this case, OH groups that reside on a molecule. The number average molecular weight (Mn) should be preferably more than 200 and less than 297, and preferentially about 247.

Any laminated lens using the adhesive according to the invention can be coated. Such coatings include protective coatings, hard-coat, anti-reflective (AR) coating, photochromic coating, tinted coatings, anti-fog coatings or anti-smudge coatings. The polarizing structure can be applied to any type of optical substrate material. For example, lenses manufactured by an edge-gated injection molding process or a casting process may be used. The lens can be formed in situ with the polarizing structure by film insert molding or casting. In addition the lens can be made from any optical grade material, for example, thermoplastic or thermoset materials. The polarizing structure can be used with all types of piano or ophthalmic lenses, semi-finished or finished lenses. The invention is especially effective for film laminated lens applications where film separation is an issue, for example during surfacing of semi-finished lenses or during wheel edging. This adhesive described herein reduces or eliminates wafer delamination during surfacing or edging operations.

Having described preferred embodiments for adhesive, polarizing layered structures, methods for manufacturing same, and polarized lenses (which are intended to be illustrative and not limiting), it is noted that modifications and variations can be made by persons skilled in the art in light of the above teachings. For example, other equivalent compounds can be included in the adhesive depending on the intended application. In addition, other or additional manufacturing steps, or steps in different orders may be carried out to achieve similar results.

What is claimed:

1. A polyurethane based adhesive obtained by reacting at least one polyisocyanate compound with at least one polyol compound derived from caprolactone monomer, wherein the at least one polyol compound has a number average molecular weight more than 200 and less than 297 and a functionality in a range between 2.3 and 2.5, inclusive of the endpoints wherein the at least one polyisocyanate compound is a hexamethylene diisocyanate and the at least one polyol compound derived from caprolactone monomer is a polycaprolactone polyol, wherein NCO:OH ratio of the at least one polyisocyanate compound and the at least one polyol compound is 3:1.

2. A polarizing structure comprising:
a polarizing film;
a protective film provided on at least one face of the polarizing film with an adhesive layer,
wherein said adhesive layer is a layer of the polyurethane based adhesive of claim 1.

3. The polarizing structure according to claim 2, wherein two protective films are placed on each side of the polarizing film.

4. The polarizing structure according to claim 3, wherein the polarizing film is a light-polarizing polyvinyl alcohol-based layer (PVA), and each of said protective films are independently selected from the group consisting of polycellulosics, polycarbonates, polyesters, poly(meth)acrylics, polycyclic olefin copolymers, polyolefin, thermoplastic polyurethanes, polythiourethanes, polyvinyls, polystyrenes, polyamides, polyimides, polysulfones, polyether sulfones, poly ether ether ketones, polyphenylene sulfides, polyoxymethylenes, polyurethanes, epoxys or blend thereof.

5. The polarizing structure according to claim 4, wherein the polarizing film is a light-polarizing polyvinyl alcohol-based layer (PVA).

6. A method for manufacturing a polarizing structure comprising the following steps:
providing a polarizing film;
providing a protective film on at least one face of the polarizing film;
deposing a layer of polyurethane based adhesive of claim 1 between said polarizing film and said protective film;
pressing the protective film against the polarizing film to form a polarizing structure; and
curing the polarizing structure at a temperature between 40° C.-90° C. for about 16 hours.

7. The method of claim 6, wherein prior to said deposing a layer of polyurethane based adhesive, the method further includes a step of surface treating of the protective film with at least a caustic treatment.

8. The method of claim 6, wherein said deposing a layer of polyurethane based adhesive comprises spin coating or roll coating the adhesive either onto one face of the polarizing film or one face of the protective film, or one face of the polarizing film and one face of the protective film.

9. A polarized optical element comprising:
an optical base element;
a polarizing structure; and
an adhesive layer placed between one surface of the optical base element and the polarizing structure so as to permanently retain said polarizing structure on the surface of the optical base element,
wherein the polarizing structure comprises a polarizing film and a protective layer provided on at least one face of the polarizing film with a polyurethane based adhesive of claim 1.

10. The element according to claim 9, wherein said adhesive layer includes a tri-layer adhesive which comprises a layer of hot melt adhesive layer sandwiched between two latex layers.

11. The element according to claim 9, wherein said adhesive includes a pressure sensitive adhesive.

12. The element according to claim 9, which further includes at least one functional coating placed on the protective film on the opposite side of said protective film from the polarizing film, said coating selected from the group consisting of hard coating, anti-reflective coating, photochromic coating, tinted coating, anti-fog coating and anti-smudge coating.

* * * * *